United States Patent
Wickham

(10) Patent No.: US 6,707,203 B2
(45) Date of Patent: Mar. 16, 2004

(54) ELECTRIC MOTOR WITH INTEGRAL ATTACHMENT MEANS

(75) Inventor: Kenneth P. Wickham, Palm, PA (US)

(73) Assignee: PEM Management, Inc., Wilmington, DE (US)

( * ) Notice: Subject to any disclaimer, the term of this patent is extended or adjusted under 35 U.S.C. 154(b) by 24 days.

(21) Appl. No.: 10/269,056

(22) Filed: Oct. 11, 2002

(65) Prior Publication Data

US 2003/0107284 A1 Jun. 12, 2003

Related U.S. Application Data

(60) Provisional application No. 60/331,138, filed on Nov. 9, 2001.

(51) Int. Cl.[7] .............................................. H02K 5/16
(52) U.S. Cl. .......................... 310/91; 310/90; 284/680; 284/681; 284/500
(58) Field of Search ............................ 310/91, 90, 680; 284/681, 500

(56) References Cited

U.S. PATENT DOCUMENTS

| | | | | |
|---|---|---|---|---|
| 3,583,835 A | | 6/1971 | Coburn, Sr. ................ 417/360 |
| 4,924,766 A | | 5/1990 | Hitch ........................... 99/421 |
| 5,104,280 A | * | 4/1992 | Ziaylek et al. ............... 414/462 |
| 5,944,497 A | | 8/1999 | Kershaw et al. ............. 417/312 |
| 6,017,004 A | * | 1/2000 | Grantham .................... 248/27.3 |
| 6,176,056 B1 | * | 1/2001 | MacKarvich ............... 52/293.3 |
| 6,230,723 B1 | | 5/2001 | Hixson ......................... 135/16 |

* cited by examiner

*Primary Examiner*—Nicholas Ponomarenko
*Assistant Examiner*—Iraj A. Mohandesi
(74) *Attorney, Agent, or Firm*—Gregory J. Gore

(57) ABSTRACT

An electric motor with integral attachment means includes two lever arms spaced equally about the circumference of the motor housing. The lever arms are hingeably connected to the motor housing and are rotatable between clamped and relaxed positions. An attachment foot located at the end of each lever releasably engages a mounting plate, thereby effecting the mounting and dismounting of the motor to the mounting plate. The lever arms are resilient and radially outwardly bowed in the relaxed state so that they can be locked in their clamped position by the snap action between the levers and radially-extending tabs on the motor housing. Feet of the lever arms engage mounting holes in a mounting plate and when in the locked position a heel element of each lever arm foot occupies a slot in the motor housing and thereby the foot of each lever arm resiliently applies a clamp force against the motor housing and the mounting plate.

13 Claims, 2 Drawing Sheets

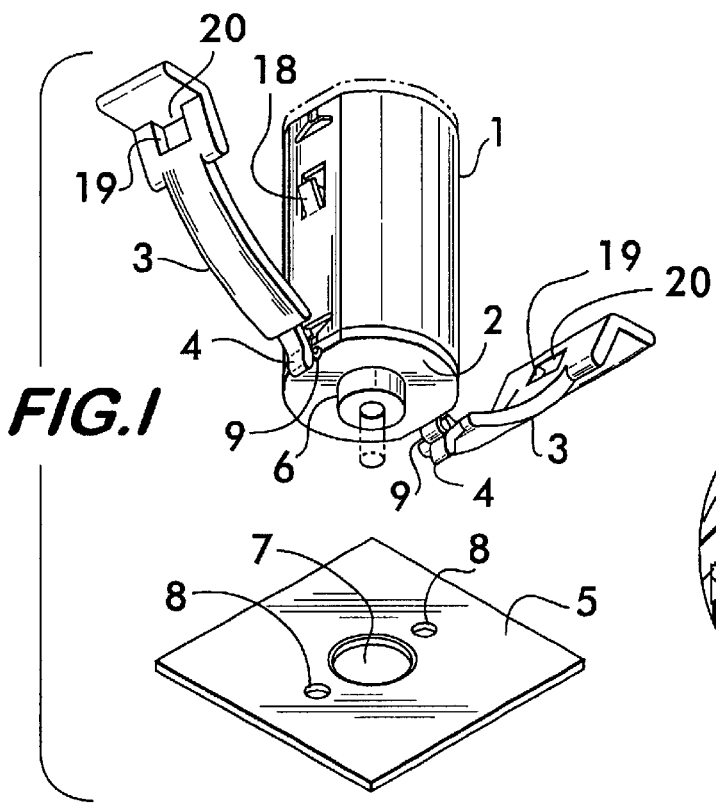
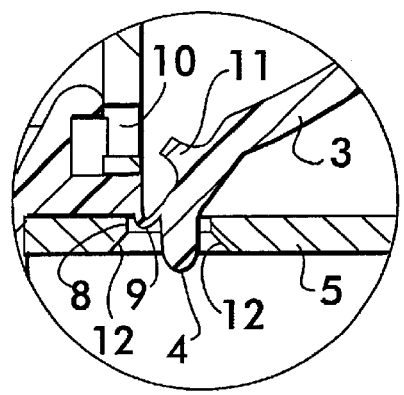
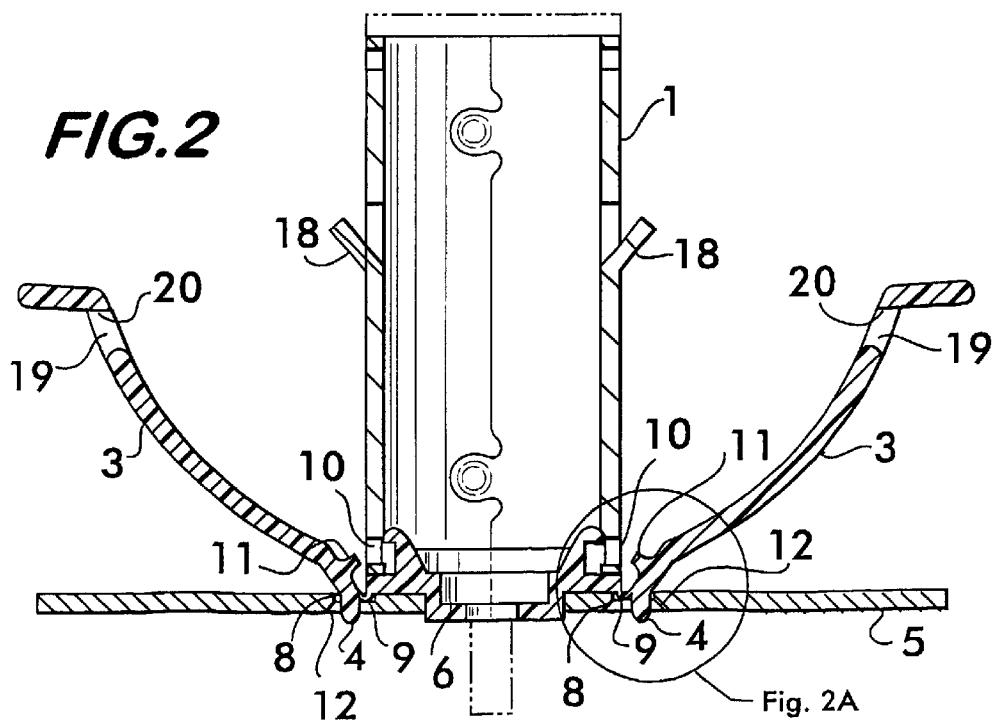

ELECTRIC MOTOR WITH INTEGRAL ATTACHMENT MEANS

The present application is related to provisional patent application Ser. No. 60/331,138 entitled "Electric Motor with Integral Attachment Means" filed on Nov. 9, 2001, priority from which is hereby claimed.

FIELD OF THE INVENTION

This invention pertains to means of rapidly and reliably attaching a small electric motor to its mounting surface. More specifically, this invention relates to means for attaching a motor to a support surface without the use of screws or other loose hardware.

BACKGROUND OF THE INVENTION

Small electric motors, typically those having an outside diameter of less than three inches, are used in a myriad of consumer, industrial, and medical devices such as computer printers, ticket printers, centrifuges, and the like. In almost all cases, such motors are used to provide rotary motion to these devices and are attached to a mounting surface or plate with the motor shaft, or drive shaft, protruding through the plate. Pulleys, spur gears, couplings, shafts, or the like may be attached to the drive shaft and form the beginning of the device drive train.

Almost universally, such small motors are secured to the mounting plate by two to four screws which pass through the plate from the drive shaft side (hereinafter "front side") and engage threaded holes in the motor face or endbell. During the assembly of the motor to the device, the loose mounting screws are oriented, inserted through the mounting plate, and then driven into the motor face endbell with relative ease due to the fact that other components that form the drive train are typically installed after the drive motor is installed.

Reversing the procedure, however, is much more difficult. When a motorized device fails, in many cases it is the motor that fails due to brush failure, overheating, shorted windings, and the like. Typically it is only the motor that needs to be replaced to put the unit back into service. However, since the motor is secured to the mounting plate by screws that engage the motor from the front side, access to that side must be provided and that often requires disassembly of the drive train. This can be a time-consuming process involving costly labor to disassemble the device, replace the motor, and reassemble the unit. In fact, such service costs can be so significant that the entire device is replaced rather than merely replacing the motor.

Thus, there is a need in the art for a motor mounting system which overcomes the above disadvantages by providing means to install and, if need be, to replace the motor from the back side or motor side of the mounting plate. In addition, there is a need for a mounting device that allows the rapid installation of a motor on an assembly line by eliminating the need for loose attaching screws.

SUMMARY OF THE INVENTION

In order to meet the needs in the art described above, the present motor mount system has been devised. The invention consists of a plastic, molded motor endbell having two integral resilient lever arms that engage mating holes in the mounting surface. Each lever arm is in the form of a curved leaf spring which extends rearward along the sides of the motor housing. The integral lever arms are free to swing away from the sides of the housing by a diminished portion of their structure adjacent the endbell which forms a "living hinge." The mounting plate or support surface to which the motor is to be mounted is provided with three holes, one for receiving a locating boss of the motor endbell which is part of the motor housing, and two mounting holes for receiving the ends of the lever arms. All three holes are in line with the center hole and ultimately with the motor drive shaft. The center hole is sized to receive an alignment boss which projects from the endbell and so that a spur gear typically affixed to the drive shaft may pass through the hole.

Mounting the motor is accomplished as follows. First, the motor is presented to the mounting surface and the boss of the motor endbell is inserted into the center hole. Next, the lever arms are flexed outward and a foot at the front end of each lever is inserted through the mounting holes. The lever arms are then squeezed inwardly and their motion causes their ends (hereinafter "feet") to lever-lock against the opposite side of the mounting surface. As greater force is applied, the naturally bowed lever arms straighten against the applied force and lengthen sufficiently so that slots in the arms clear bent-out tabs of the motor housing and move to a position behind the tabs. Thereafter, a release of pressure on the arms causes them to shorten and resume their natural bowed shape placing them behind the tabs and locking them into place. Because this final locking function occurs without lever rotation, the feet of the lever arms remain clamped into the mounting surface. Thus, by these mechanical relations, the motor housing becomes securely affixed to the mounting surface until it is later released by unlocking the lever arms and reversing the installation process.

More specifically, the applicant has invented an electric motor with integral attachment means comprising a motor housing, at least two lever arms spaced equally about the circumference of the motor housing and hingeably connected to the motor housing at living hinge joints, the levers being movable between clamped and released positions, and an attachment foot located at one end of each lever arm being integral therewith, the foot lying adjacent the hinge joint and extending radially outwardly from the motor housing to a distal end thereof. The lever arm further includes a radially inwardly-projecting heel which occupies a notch in the motor housing when the lever arm is in the clamped position. The lever arms are resilient and radially outwardly bowed in their relaxed state and further include a slot adjacent a second end thereof, the slot being engageable with a motor housing locking tab when in the clamped position. The locking tab extends radially outward from the motor housing. The housing includes an endbell at a mounting end thereof and the feet of the attachment levers extend axially beyond the endbell. The motor housing includes a mounting plate with a center hole for receiving an axially projecting boss on the endbell and two mounting holes located on opposite sides of the center hole laterally, each mounting hole having sidewalls forceably engaging a lever arm foot. The mounting holes have axes which are parallel to the motor housing axis. The mounting holes also have radially divergent sidewalls in the axial direction away from the housing. The endbell, hinges, and lever arms of the motor housing may be portions of a unitary molded plastic structure. The hinge joint of the motor housing provides a laterally deflectable interconnection of the arms with the housing, while the foot of each lever arm provides a resiliently-loaded clamp force against the housing and the mounting plate.

It is therefore the primary object of the invention to provide a self-contained mounting device as an integral part of an electric motor which allows the easy installation of the motor and eliminates the need for loose hardware. It is a further object of the invention to accomplish this primary object with cooperating mounting surface structures which may be economically formed. These and other objects and advantages of the present invention will be apparent to those of skill in the art from the following drawings and description of the preferred embodiment.

BRIEF DESCRIPTION OF THE DRAWINGS

FIG. 1 is a bottom left front isometric view of the present invention.

FIG. 2 is a front sectional view of the present invention with the attachment means in the unlocked position.

FIG. 2A is a close-up view taken from FIG. 2 as shown in that figure.

DESCRIPTION OF THE PREFERRED EMBODIMENT

Figure 3:
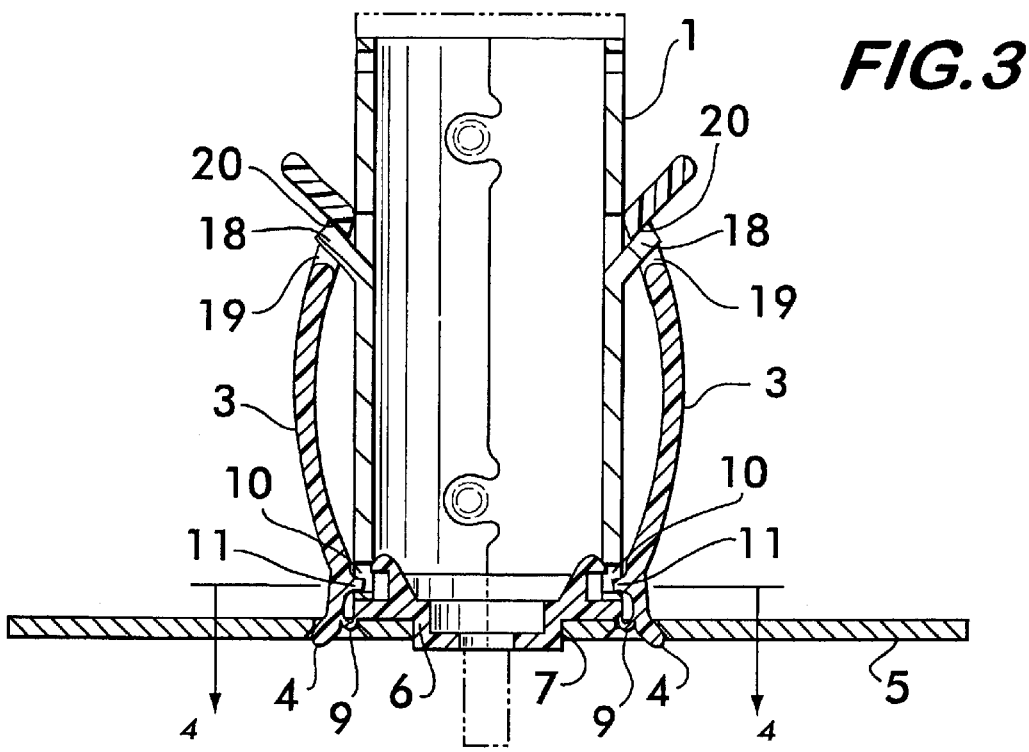
FIG. 3 is a front sectional view of the present invention with the motor shown in its fully engaged position.

FIG. 1 shows the major elements of the lever-lock motor mount of the invention. The motor housing 1 includes endbell 2 that has two resilient lever arms 3 on opposite sides attached by living hinges 9 that allow the arms to swing in the axial plane away from opposite sides of the motor. Each lever arm 3 has a panel-engaging foot 4 at one end and an outwardly-angled finger grip portion at the other end. The motor shell or housing includes protruding metal tabs 18 which lock in the lever arms 3 when in their fully-engaged position. The housing further includes alignment boss 6. Mounting plate 5 is the support structure to which the motor becomes attached. The mounting plate 5 requires three holes at the desired mounting location, a larger center hole 7 flanked by two smaller mounting holes 8, each at an equal distance from the center hole. The two mounting holes 8 have standard countersinks on the front side of the mounting plate which the feet of the lever arms engage as further described below. The center hole 7 is sized to closely receive boss 6.

This figure illustrates the alignment that is required prior to installation of the motor to the mounting plate 5 which begins as follows. First, the centerline of the motor is aligned with the axis of center hole 7 in a perpendicular attitude to the mounting plate which then permits a nose piece or alignment boss 6 to be inserted into the center hole 7. Next, the entire assembly is rotated until the two feet 4 are in line with each of the two mounting holes 8 in the mounting plate 5 and the motor is then seated in the mounting plate as shown in FIG. 2. At this point, the lever arms 3 are in a relaxed position to allow easy insertion of the feet 4 into the mounting holes 8. The relaxed position is the position of the lever arms 3 in their as-molded free state with little or no stress in either of the two living hinges 9. The free end of each arm includes a slot 19 having a top edge 20.

Referring to FIG. 2, installation continues as follows. With the motor properly positioned on the mounting plate 5, and the feet 4 of the lever arms 3 inserted through the mounting holes, the lever arms are then rotated inward toward the motor housing 1. This clamps the motor to the mounting plate by the following operations. First, the heel 11 of each lever arm foot moves into notch 10 in the housing to establish the required structural fulcrum for the lever arm 3 which forces the toe portion of each foot 4 against the countersink 12. Secondly, as greater force continues to be applied, each foot 4 progressively makes greater contact with the countersink 12. Because each lever foot is angled outwardly, the camming action against the countersink surface draws the motor endbell 2 more forcefully against the surface of the mounting plate 5 while simultaneously moving the foot 4 inward, driving the heel 11 more deeply into the notch 10. Thus, the heels alone are the attachment force transmitting structures which compress opposite sides of the motor housing inward and downward. The movement of the heel 11 into notch 10 and the engagement of foot 4 with the mounting plate become complete prior to the lever arm 3 reaching the housing 1. This ensures that the foot of each lever arm provides a resiliently loaded clamp force between the housing and the mounting plate when fully engaged.

FIG. 2A shows greater detail at the hinge joint. Each hinge 9 attaches the foot of each lever arm 3 to the endbell and is connected to each foot at a point between the end or toe of the foot 4 and a heel 11 which projects inwardly. The housing further includes notches 10 which receive each heel to compressively attach the motor to the lever arms 3, and hence to the mounting plate 5. Hole 8 is countersunk, providing angled side surfaces 12 which allow the same motor mounting structures to be used with mounting plates of varying thickness. It is not a requirement that the lever arms extend through the mounting plate. Only contact with the angled side surfaces 12 is required.

The above described operations are made possible by the properties of the hinge element 9. This strap-type hinge or "living hinge" holds the lever arms in the required position with regard to the endbell and also allows their flexure and movement in two different ways. It allows the lever arms to rotate at the hinge joint in the axial plane and also permits the inward lateral movement of the lever arms so that the heel portion can more directly enter the notch of the endbell. This compound motion provided by the hinges is an important feature of the invention. It will be further understood that the applied clamp force is not carried by the hinge element in the present invention, thus permitting the use of a very flexible strap-type hinge which can be economically molded as a unitary part which includes the endbell, hinge, and lever arm components. A variety of plastic materials may be used which provide the required durability and resilience.

FIG. 3 shows the position of full engagement with lever arms 3 rotated up against the housing 1 so that the edge 20 at the top of the slot 19 is resiliently captured behind tab 18. At this point the lever arm 3 is spring-loaded, and the motor housing 1 is firmly held against the surface of the mounting plate 5 with the heel 11 fully seated in the notch 10 and the foot 4 fully engaged with the countersink 12 on the opposite side of the mounting surface. This is accomplished simply by applying an inward closing force in the middle of the lever arms 3. Being resisted by the clamping force at the end of the levers, the closing force causes the lever arms 3 to straighten enough to allow the top edge of the slot 20 to clear the end of the tab 18. Then, by simply releasing the applied force, the lever arms 3 relax back to their natural bowed shape and the top of the slot 19 is pulled into the well between the back of the tab 18 and the housing 1.

Figure 4:
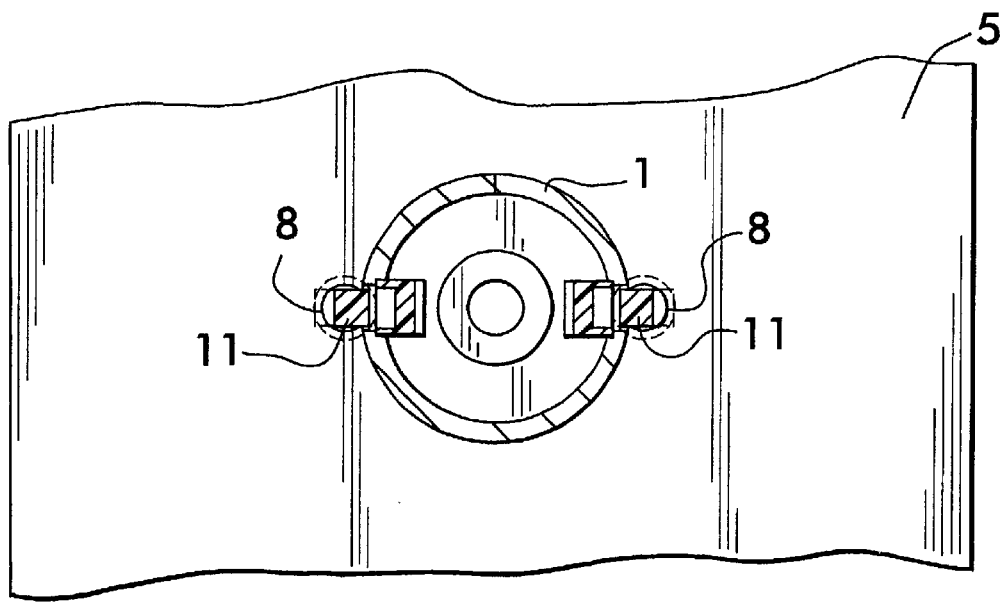
FIG. 4 is a top sectional view taken from FIG. 3 as shown in that figure.

FIG. 4 is a sectional top view showing greater detail of the attachment joint. When fully engaged, the heel portion of the foot of the lever arm is deeply-seated within a notch in the motor housing 1 while the toe area of the foot extends through a mounting hole 8. As previously described, this firmly and resiliently attaches the motor to the mounting plate 5.

All of the foregoing operations can be accomplished by simple manual application of finger pressure inward against the lever arms. Later, the lever arms may be unlocked and the motor released from the mounting plate by simply reversing the steps of the above-described mounting process. Angled finger grips at the ends of the lever arms provide easy application of finger force to the ends of the lever arms in the outward direction to unlock them from behind the housing tabs. Because the manual clamp actuation forces are equal and opposite in direction, clamping the motor to the mounting plate does not exert any net forces on the motor, thus adding to the ease of installation.

From the foregoing drawings and description of the preferred embodiment, it will be readily apparent that the objects of the invention have been achieved. In the preferred embodiment, the lever arms produce great mechanical advantage so that a high clamp force is achieved by normal finger pressure against the clamp arms. Thus, the motor may be rigidly affixed to the mounting plate manually, without the need for tools. Since the lever arms are integral with the motor housing, there are no additional parts required or to loosen and possibly foul the assembled mechanism. Another advantage of the present invention is that the preparation of the mounting plate requires only simple drilled round holes which are economical to form. The countersink surfaces on the backside of the mounting holes are also economically made. Furthermore, the mounting holes act to secure the motor both axially and radially. And finally, because the clamp attachment is resilient, it resists vibration and does not require close manufacturing tolerances.

It should be understood that there may be other modifications and changes to the present invention that will be obvious to those of skill in the art from the foregoing description, however, the present invention should be limited only by the following claims and their legal equivalents.

What is claimed is:

1. An electric motor with integral attachment means, comprising:
   a motor housing;
   at least two lever arms spaced equally about the circumference of the motor housing and hingeably connected to said motor housing at hinge joints, said levers being movable between clamped and released positions; and
   an attachment foot located at one end of each lever arm being integral therewith, said foot lying adjacent said hinge joint and extending radially outwardly from said motor housing for releasable attachment to a mounting plate.

2. The motor housing of claim 1 wherein said lever arm further includes a radially inwardly-projecting heel which occupies a notch in said motor housing when said lever arm is in the clamped position.

3. The motor housing of claim 2 wherein said lever arms are resilient and radially outwardly bowed in their relaxed state.

4. The motor housing of claim 3 wherein each lever arm further includes a slot adjacent a second end thereof, said slot being engageable with a motor housing locking tab when in the clamped position.

5. The motor housing of claim 4 wherein said locking tab extends radially outward from said motor housing.

6. The motor housing of claim 5 wherein said housing further includes an endbell at a mounting end thereof and said feet of said attachment levers extend axially beyond said endbell.

7. The motor housing of claim 6 wherein said hinge joint is a living hinge.

8. The motor housing of claim 7 further including a mounting plate, said mounting plate having a center hole for receiving an axially projecting boss on said endbell and further including two mounting holes located on opposite sides of said center hole laterally, each mounting hole having sidewalls forceably engaging a lever arm foot.

9. The assembly of claim 8 wherein said mounting holes have axes which are parallel to said motor housing axis and said holes further include radially divergent sidewalls in the axial direction away from said motor housing.

10. The motor housing of claim 6 wherein said endbell, said hinges, and said lever arms are portions of a unitary molded plastic structure.

11. The motor housing of claim 1 wherein said hinge joint provides a laterally deflectable interconnection of said arms with said housing.

12. The assembly of claim 8 wherein the foot of each lever arm provides a resiliently-loaded clamp force against the housing and the mounting plate.

13. The assembly of claim 12 wherein said clamp force is supplied against said housing by the heel of said lever arm foot.

* * * * *